United States Patent
Kim et al.

(10) Patent No.: US 11,370,806 B2
(45) Date of Patent: Jun. 28, 2022

(54) PREPARATION METHOD OF SOLID CATALYST FOR PROPYLENE POLYMERIZATION

(71) Applicant: HANWHA TOTAL PETROCHEMICAL CO., LTD., Seosan-Si (KR)

(72) Inventors: Eun Il Kim, Seosan-Si (KR); Jin Woo Lee, Seosan-si (KR)

(73) Assignee: HANWHA TOTAL PETROCHEMICAL CO., LTD., Seosan-si (KR)

(*) Notice: Subject to any disclaimer, the term of this patent is extended or adjusted under 35 U.S.C. 154(b) by 24 days.

(21) Appl. No.: 17/034,594

(22) Filed: Sep. 28, 2020

(65) Prior Publication Data
US 2021/0115073 A1    Apr. 22, 2021

(30) Foreign Application Priority Data
Oct. 21, 2019    (KR) .................. 10-2019-0130859

(51) Int. Cl.
*C07F 7/28*    (2006.01)
*C08F 10/06*    (2006.01)

(52) U.S. Cl.
CPC ............... *C07F 7/28* (2013.01); *C08F 10/06* (2013.01)

(58) Field of Classification Search
None
See application file for complete search history.

(56) References Cited

U.S. PATENT DOCUMENTS 4,725,656 A * 2/1988 Kashiwa ............... C08F 10/00 526/125.3

FOREIGN PATENT DOCUMENTS

JP    WO2017188180    *    4/2017    ............ C08F 4/654

OTHER PUBLICATIONS

WO2017199180 machine translation from Google Patents (downloaded Dec. 17, 2021).*

* cited by examiner

*Primary Examiner* — Clinton A Brooks
(74) *Attorney, Agent, or Firm* — Harness, Dickey & Pierce, P.L.C.

(57) ABSTRACT

Disclosed is a method for preparing a solid catalyst for propylene polymerization, and more specifically, a method for preparing a solid catalyst for propylene polymerization including (1) first reacting dialkoxy magnesium and titanium halide compound under the presence of an organic solvent; (2) adding two kinds of non-aromatic internal electron donors to a product of the step (1) and reacting the mixture; and (3) second reacting the product of the step (2) with a titanium halide compound and washing a reaction product. The catalyst prepared according to the method as described in the present disclosure not only may provide high catalytic activity, but also may provide a propylene polymer having excellent stereoregularity.

3 Claims, No Drawings

PREPARATION METHOD OF SOLID CATALYST FOR PROPYLENE POLYMERIZATION

CROSS-REFERENCE TO RELATED APPLICATION

This application claims the benefit and priority of Korean Patent Application No. 10-2019-0130859 filed Oct. 21, 2019. The entire disclosure of the above application is incorporated herein by reference.

FIELD

The present disclosure relates to a method for preparing a solid catalyst for propylene polymerization, and more specifically, a method for preparing a solid catalyst for propylene polymerization including (1) first reacting dialkoxy magnesium and titanium halide compounds under the presence of an organic solvent; (2) adding two kinds of non-aromatic internal electron donors to a product of the step (1) and reacting the mixture; and (3) second reacting the product of the step (2) with a titanium halide compound and washing a reaction product. The catalyst prepared according to the method as described in the present disclosure not only may provide high catalytic activity, but also may provide a propylene polymer having excellent stereoregularity.

BACKGROUND

This section provides background information related to the present disclosure which is not necessarily prior art.

Polypropylene is a very useful industrial material. In particular, it is widely used for various purposes related to automobiles and electronic products. In order to increase the application of the polypropylene, it is important to improve rigidity by increasing crystallinity thereof. For this purpose, a solid catalyst for propylene polymerization must be designed to exhibit high stereoregularity.

In polymerization of olefins such as the propylene, a solid catalyst containing magnesium, titanium, an electron donor and halogen as essential components is known. Many methods have been proposed to polymerize or copolymerize olefins using a catalyst system composed of this solid catalyst, an organoaluminum compound, and an organosilicon compound. However, those methods may not obtain a high stereoregularity polymer at high yield, and thus improvement thereof is required.

In the catalyst for the propylene polymerization, catalytic activity is one of the most basic and important properties. When the activity is high, a smaller amount of catalyst may be used. Thus, a preparation cost may be reduced, and metal catalyst residues such as magnesium, titanium, and halogen, and residual amounts of volatile substances such as hexane used for catalyst injection may be reduced.

In the propylene polymerization as described above, in order to lower the cost via an increase in catalyst activity, and in order to improve the properties of polymers by improving catalyst performance such as stereoregularity, a method of using a diester of an aromatic dicarboxylic acid as an internal electron donor is widely known. Patents thereof have been filed. Examples thereof may include U.S. Pat. Nos. 4,562,173, 4,981,930, Korean Patent No. 0072844, etc. The above patents introduce a catalyst preparation method that expresses high activity and high stereoregularity using aromatic dialkyl diesters or aromatic monoalkyl monoesters.

However, the diester compound of the aromatic dicarboxylic acid such as those used in the above patents is known as an environmental hormonal substance capable of adversely affecting humans and ecosystems, such as deterioration of human reproductive function, growth disorders, malformations, and cancer, even in very small amounts thereof. Therefore, in recent years, there is a demand for using an eco-friendly material as an internal electron donor in the polypropylene preparation used for food packaging containers and medical devices. Further, the methods of the above patents may not obtain the high-stereoregularity polymer at a high yield, and thus improvement thereof is required.

In one example, a catalyst preparation method using a non-aromatic diether material in addition to the alkyl ester as described above as the internal electron donor is known (Korean Patent No. 0491387). Further, a catalyst preparation method using a non-aromatic substance simultaneously having ketone and an ether functional group in addition to the alkyl ester as described above as the internal electron donor is known (Korean Patent No. 0572616). However, both of these two methods should be significantly improved in terms of both activity and stereoregularity.

Further, U.S. Pat. No. 6,048,818 discloses a method of preparing a catalyst using malonate as an internal electron donor. However, this method has the disadvantage that the activity and the stereoregularity are so low that it is not suitable for commercial use.

SUMMARY

This section provides a general summary of the disclosure, and is not a comprehensive disclosure of its full scope or all of its features.

A purpose of the present disclosure is to solve the problems of the prior arts as described above. A purpose of the present disclosure is to provide a preparation method of a solid catalyst for propylene polymerization in which the solid catalyst may allow preparing polypropylene with excellent stereoregularity at high yield while the catalyst is free of environmentally harmful substances.

Other purposes and benefits of the present disclosure will become clearer by reference to the following descriptions and claims of the present disclosure.

In order to achieve the above purposes, the present disclosure provides a method for preparing a solid catalyst for propylene polymerization, the method being characterized by including:

(1) first reacting dialkoxy magnesium and titanium halide compounds under the presence of an organic solvent;

(2) adding two kinds of non-aromatic internal electron donors to a product of the step (1) and reacting the mixture; and (3) second reacting the product of the step (2) with a titanium halide compound and washing a reaction product.

The organic solvent used in the step (1) is not particularly limited in terms of a type and may include aliphatic hydrocarbons, aromatic hydrocarbons, or halogenated hydrocarbons having 6 to 12 carbon atoms. More preferably, a saturated aliphatic or aromatic hydrocarbon or a halogenated hydrocarbon having 7 to 10 carbon atoms may be used as the organic solvent. A specific example thereof may include one or more selected from the group consisting of octane, nonane, decane, toluene and xylene, chlorobutane, chlorohexane and chloroheptane. Those may be used alone or in combination with each other.

The dialkoxy magnesium used to produce magnesium chloride as a carrier in the step (1) may preferably include diethoxy magnesium. The dialkoxy magnesium may be in a form of a spherical particle obtained by reacting metal magnesium with anhydrous alcohol in the presence of a reaction initiator such as magnesium chloride. The spherical particle has an average particle diameter of 10 to 200 μm, and has a smooth surface. It is preferable that the spherical particle shape is maintained as it is even during polymerization of propylene. When the average particle diameter is smaller than 10 μm, the fine particles of the prepared catalyst increase, thereby causing agglomeration of the polymer during polymerization to cause process problems, which is not preferable. When the diameter exceeds 200 μm, an apparent density tends to be smaller, which is not preferable.

The titanium halide used in the step (1) during the preparation of the solid catalyst is preferably represented by a following general formula (I):

$$Ti(OR)_a X_{(4-a)} \quad (I)$$

where R is an alkyl group of 1 to 10 carbon atoms, X is a halogen element, a is an integer of 0 to 3 to satisfy a valence of the general formula. It is particularly preferable to use titanium tetrachloride as the titanium halide.

The reaction in the step (1) during the preparation process of the solid catalyst is preferably carried out by gradually adding the titanium halide to the solvent while the dialkoxy magnesium is suspended in the organic solvent in a temperature range of 0 to 30° C.

In the step (1), an amount of the titanium halide used is preferably 0.1 to 10 moles, more preferably 0.3 to 2 moles per 1 mole of the dialkoxy magnesium. When the content is less than 0.1 mole, a conversion reaction of dialkoxy magnesium to magnesium chloride does not proceed smoothly. When the content exceeds 10 mole, an excessive amount of the titanium component is present in the catalyst, which is not preferable.

In the preparation process of the solid catalyst for the propylene polymerization, the internal electron donor mixture used in the step (2) may include a mixture between 1,4-cyclohexadiene-1,2-dicarboxylic acid 1,2-dialkylester compound (A) and any one selected from the group consisting of ethyl benzoate (B), 9,9-bis(methoxymethyl)fluorene (C), and 2-isopropyl-2-isopentyl-1,3-dimethoxypropane (D).

In the preparation process of the solid catalyst for the propylene polymerization, the internal electron donor mixture used in the step (2) may include a mixture between 1,4-cyclohexadiene-1,2-dicarboxylic acid 1,2-dialkylester compound (A) and any one selected from the group consisting of ethyl benzoate (B), 9,9-bis(methoxymethyl)fluorene (C) and 2-isopropyl-2-isopentyl-1,3-dimethoxypropane (D).

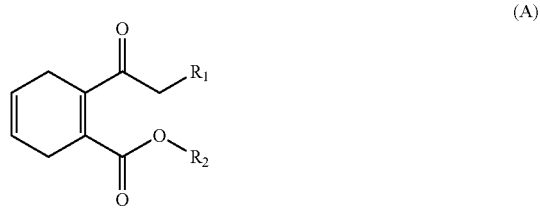

(A)

where each of $R_1$ and $R_2$ represents a linear or branched alkyl group of 2 to 8 carbon atoms or a cyclic alkyl group of 3 to 8 carbon atoms.

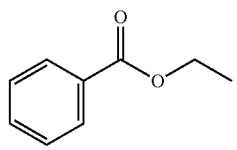

(B)

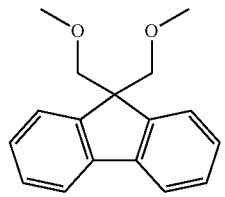

(C)

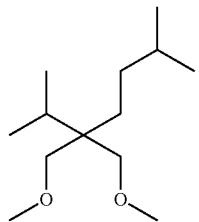

(D)

The step (2) is preferably carried out by introducing the internal electron donor while gradually increasing a temperature of the product of the step (1) to 80 to 130° C. and reacting them for 1 to 3 hours. When the temperature is lower than 80° C. or the reaction time is smaller than 1 hour, the reaction may not be completed. When the temperature exceeds 130° C. or the reaction time exceeds 3 hours, the polymerization activity of the catalyst as the product or the stereoregularity of the polymer may be lowered due to side reactions.

As long as the internal electron donor is input during the temperature increasing process, an input temperature and the number of inputs thereof are not particularly limited. A total amount of the internal electron donor is preferably 0.1 to 1.0 mole per 1 mole of dialkoxy magnesium as used. When the content of the internal electron donor does not meet the above range, the polymerization activity of the catalyst as the product or the stereoregularity of the polymer may be lowered, which is not preferable.

In the preparation process of the solid catalyst, the step (3) includes second reacting the product of the step (2) with a titanium halide compound and washing a reaction product. In this step, the titanium halide is supported on the product of the step (2). It is more preferable to perform the step (3) at a temperature of 80 to 130° C. in order to induce second activation of the product of the step (2) using the titanium halide compound.

When the solid catalyst for propylene polymerization as prepared by the method of the present disclosure is used, the solid catalyst may allow production of polypropylene having excellent stereoregularity at high yield while the solid catalyst is free of environmentally harmful substances.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DETAILED DESCRIPTION

The present disclosure will be described in more detail through following examples. However, these examples are for illustrative purposes only, and the present disclosure is not limited to these examples.

EXAMPLE

Example 1

[Preparation of Solid Catalyst]

150 ml of toluene and 20 g of diethoxy magnesium (average particle size: 20 μm) were added to a glass reactor having a 1 liter size and sufficiently substituted with nitrogen and equipped with a stirrer. Then, the reactor was maintained at 10° C. After diluting 40 ml of titanium tetrachloride into 60 ml of toluene, the diluted solution was input to the reactor over 1 hour. Then, while raising the reactor temperature to 110° C., 16.8 mmol (4.71 g) of 1,4-cyclohexadiene-1,2-dicarboxylic acid 1,2-dibutylester (A, $R_1=R_2$=butyl) and 5.6 mmol (0.84 g) of ethyl benzoate (B) were injected to the reactor. After maintaining the reactor at 110° C. for 2 hours, the reactor temperature was lowered to 90° C. to stop stirring and remove a supernatant. Washing thereof was carried out once using 200 ml of toluene using the same method.

In this connection, 150 ml of toluene and 50 ml of titanium tetrachloride were added to thereto, and a temperature was raised to 110° C. and this state was maintained for 2 hours. A slurry mixture subjected to an aging process was washed with 200 ml of toluene per a single washing time. This washing was conducted twice. Then, the slurry mixture was washed with 200 ml of normal hexane per a single washing time at 40° C. This washing was conducted five times, thereby to obtain a light yellow solid catalyst component.

[Polypropylene Polymerization]

10 mg of the above solid catalyst and 6.6 mmol of triethylaluminum, 0.66 mmol of dicyclopentyldimethoxysilane were added into a 4-liter sized high-pressure stainless steel reactor. Subsequently, 1000 ml of hydrogen and 2.4 L of propylene in a liquid state were sequentially added thereto, and then a reactor temperature was raised to 70° C. to perform polymerization. At 2 hours after the start of the polymerization, a temperature of the reactor was dropped to room temperature. At the same time, a valve was opened to completely remove propylene inside the reactor. Table 1 shows analysis results of the obtained propylene polymer.

In this connection, catalytic activity and stereoregularity were determined based on the following equations:

①Catalytic activity (kg-PP/g-catalyst)=polypropylene production amount (kg)÷amount of catalyst as injected(g)

②Stereoregularity(X.I.)=weight % of an insoluble component precipitated via crystallization in mixed xylene, relative to 100 g of polymer

Example 2

A solid catalyst was prepared in the same manner as in Example 1 except that 5.6 mmol (1.42 g) of 9,9-bis(methoxymethyl)fluorene (C) was used instead of 5.6 mmol (0.84 g) of ethyl benzoate (B) in the [Preparation of solid catalyst] step of Example 1. Then, polypropylene polymerization was performed in the same manner as in Example 1. Table 1 shows analysis results of the obtained propylene polymer.

Example 3

A solid catalyst was prepared in the same manner as in Example 1 except that instead of 5.6 mmol (0.84 g) of ethyl benzoate (B), 5.6 mmol (1.13 g) of 2-isopropyl-2-isopentyl-1,3-dimethoxypropane (D) was used in the [Preparation of solid catalyst] step of Example 1. Then, polypropylene polymerization was performed in the same manner as in Example 1, Table 1 shows analysis results of the obtained propylene polymer.

Example 4

[Preparation of Solid Catalyst]

150 ml of toluene and 20 g of diethoxy magnesium (average particle size: 20 μm) were added to a glass reactor having a 1 liter size and sufficiently substituted with nitrogen and equipped with a stirrer. Then, the reactor was maintained at 10° C. After diluting 40 ml of titanium tetrachloride into 60 ml of toluene, the diluted solution was input to the reactor over 1 hour. Then, while raising the reactor temperature to 110° C., 16.8 mmol (3.77 g) of 1,4-cyclohexadiene-1,2-dicarboxylic acid 1,2-diethylester (A, $R_1=R_2$=ethyl) and 5.6 mmol (0.84 g) of ethyl benzoate (B) were injected to the reactor. After maintaining the reactor at 110° C. for 2 hours, the reactor temperature was lowered to 90° C. to stop stirring and remove a supernatant. Washing thereof was carried out once using 200 ml of toluene using the same method.

In this connection, 150 ml of toluene and 50 ml of titanium tetrachloride were added to thereto, and a temperature was raised to 110° C. and this state was maintained for 2 hours. A slurry mixture subjected to an aging process was washed with 200 ml of toluene per a single washing time. This washing was conducted twice. Then, the slurry mixture was washed with 200 ml of normal hexane per a single washing time at 40° C. This washing was conducted five times, thereby to obtain a light yellow solid catalyst component.

[Polypropylene Polymerization]

Using the solid catalyst, polypropylene polymerization was performed in the same manner as in Example 1. Table 1 shows analysis results of the obtained propylene polymer.

Example 5

A solid catalyst was prepared in the same manner as in Example 1 except for using 5.6 mmol (1.42 g) of 9,9-bis(methoxymethyl)fluorene (C) instead of 5.6 mmol (0.84 g) of ethyl benzoate (B) in the [Preparation of solid catalyst] step of Example 4. Then, polypropylene polymerization was performed in the same manner as in Example 1. Table 1 shows the analysis results of the obtained propylene polymer.

Example 6

A solid catalyst was prepared in the same manner as in Example 4 except that instead of 5.6 mmol (0.84 g) of ethyl benzoate (B), 5.6 mmol (1.13 g) of 2-isopropyl-2-isopentyl-1,3-dimethoxypropane (D) was used in the [Preparation of solid catalyst] step of Example 4. Then, polypropylene polymerization was performed in the same manner as in Example 1. Table 1 shows analysis results of the obtained propylene polymer.

Comparative Example 1

150 ml of toluene and 20 g of diethoxy magnesium (average particle size: 20 μm) were added to a glass reactor having a 1 liter size and sufficiently substituted with nitrogen and equipped with a stirrer. Then, the reactor was maintained at 10° C. After diluting 40 ml of titanium tetrachloride into 60 ml of toluene, the diluted solution was input to the reactor over 1 hour. Then, while raising the reactor temperature to 110° C., 22.4 mmol of 1,4-cyclohexadiene-1,2-dicarboxylic acid 1,2-dibutylester (A, $R_1=R_2=$butyl) was injected to the reactor. After maintaining the reactor at 110° C. for 2 hours, the reactor temperature was lowered to 90° C. to stop stirring and remove a supernatant. Washing thereof was carried out once using 200 ml of toluene using the same method.

In this connection, 150 ml of toluene and 50 ml of titanium tetrachloride were added to thereto, and a temperature was raised to 110° C. and this state was maintained for 2 hours. A slurry mixture subjected to an aging process was washed with 200 ml of toluene per a single washing time. This washing was conducted twice. Then, the slurry mixture was washed with 200 ml of normal hexane per a single washing time at 40° C. This washing was conducted five times, thereby to obtain a light yellow solid catalyst component. Then, polypropylene polymerization was performed in the same manner as in Example 1. Table 1 shows analysis results of the obtained propylene polymer.

Comparative Example 2

150 ml of toluene and 20 g of diethoxy magnesium (average particle size: 20 μm) were added to a glass reactor having a 1 liter size and sufficiently substituted with nitrogen and equipped with a stirrer. Then, the reactor was maintained at 10° C. After diluting 40 ml of titanium tetrachloride into 60 ml of toluene, the diluted solution was input to the reactor over 1 hour. Then, while raising the reactor temperature to 110° C., 22.4 mmol of 1,4-cyclohexene-1,2-dicarboxylic acid 1,2-diethylester (A, $R_1=R_2=$ethyl) was injected to the reactor. After maintaining the reactor at 110° C. for 2 hours, the reactor temperature was lowered to 90° C. to stop stirring and remove a supernatant. Washing thereof was carried out once using 200 ml of toluene using the same method.

In this connection, 150 ml of toluene and 50 ml of titanium tetrachloride were added to thereto, and a temperature was raised to 110° C. and this state was maintained for 2 hours. A slurry mixture subjected to an aging process was washed with 200 ml of toluene per a single washing time. This washing was conducted twice. Then, the slurry mixture was washed with 200 ml of normal hexane per a single washing time at 40° C. This washing was conducted five times, thereby to obtain a light yellow solid catalyst component. Then, polypropylene polymerization was performed in the same manner as in Example 1. Table 1 shows analysis results of the obtained propylene polymer.

TABLE 1

| Examples | Internal electron donor | Activity (kg-PP/g-catalyst) | Stereoregularity (X.I., Weight %) |
| --- | --- | --- | --- |
| Example 1 | A ($R_1 = R_2$ = butyl, 16.8 mmol)/B (5.6 mmol) | 81.3 | 99.4 |

TABLE 1-continued

| Examples | Internal electron donor | Activity (kg-PP/g-catalyst) | Stereoregularity (X.I., Weight %) |
| --- | --- | --- | --- |
| Example 2 | A ($R_1 = R_2$ = butyl, 16.8 mmol)/C (5.6 mmol) | 82.6 | 99.2 |
| Example 3 | A ($R_1 = R_2$ = butyl, 16.8 mmol)/D (5.6 mmol) | 80.5 | 99.5 |
| Example 4 | A ($R_1 = R_2$ = ethyl, 16.8 mmol)/B (5.6 mmol) | 63.4 | 98.7 |
| Example 5 | A ($R_1 = R_2$ = ethyl, 16.8 mmol)/C (5.6 mmol) | 61.8 | 98.8 |
| Example 6 | A ($R_1 = R_2$ = ethyl, 16.8 mmol)/D (5.6 mmol) | 62.5 | 98.5 |
| Comp.Ex. 1 | A ($R_1 = R_2$ = butyl, 22.4 mmol) | 71.0 | 99.0 |
| Comp.Ex. 2 | A ($R_1 = R_2$ = ethyl, 22.4 mmol) | 51.2 | 97.5 |

As shown in Table 1, Examples 1 to 6 according to the present disclosure in which a mixture between 1,4-cyclohexadiene-1,2-dicarboxylic acid 1,2-dibutylester (A, $R_1=R_2=$butyl) or 1,4-cyclohexene-1,2-dicarboxylic acid 1,2-diethylester (A, $R_1=R_2=$ethyl) and one selected from the group consisting of ethyl benzoate (B), 9,9-bis(methoxymethyl)fluorene (C), and 2-isopropyl-2-isopentyl-1,3-dimethoxypropane (D) was used as the internal electron donor exhibited higher catalytic activity of the catalyst and higher stereoregularity of the polymer, than those of Comparative Examples 1 to 2 in which 1,4-cyclohexadiene-1,2-dicarboxylic acid 1,2-dibutylester (A, $R_1=R_2=$butyl) or 1,4-cyclohexene-1,2-dicarboxylic acid 1,2-diethylester (A, $R_1=R_2=$ethyl) was used alone as the internal electron donor.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for preparing a solid catalyst for propylene polymerization, the method comprising:
   (1) reacting dialkoxy magnesium and titanium halide compounds under presence of an organic solvent;
   (2) reacting a product of the step (1) with an internal electron donor mixture, wherein the internal electron donor mixture includes a mixture between 1,4-cyclohexadiene-1,2-dicarboxylic acid 1,2-dibutylester (A) and 9,9-bis(methoxymethyl)fluorene (C) or 2-isopropyl-2-isopentyl-1,3-dimethoxypropane (D):

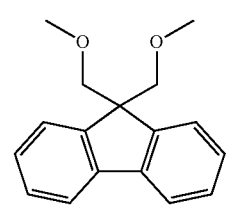

(C)

-continued (D)

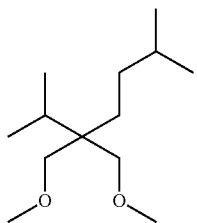

(3) reacting the product of the step (2) with a titanium halide compound, and washing the product thereof.

2. The method of claim 1, wherein the dialkoxy magnesium compound is diethoxy magnesium.

3. The method of claim 1, wherein the titanium halide is represented by a general formula (I):

$$Ti(OR)_a X_{(4-a)} \quad (I)$$

where R represents an alkyl group of 1 to 10 carbon atoms, X represents a halogen element, and a is an integer of 0 to 3 to satisfy a valence of the general formula.

* * * * *